US008762695B2

(12) United States Patent
Li et al.

(10) Patent No.: US 8,762,695 B2
(45) Date of Patent: Jun. 24, 2014

(54) COMPUTING DEVICE AND METHOD FOR REGISTERING IDENTIFICATION INFORMATION OF NETWORK INTERFACE CARD IN OPERATING SYSTEM

(75) Inventors: Yan Li, Shenzhen (CN); Shuang Peng, Shenzhen (CN); De-Hua Dang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 402 days.

(21) Appl. No.: 13/110,931

(22) Filed: May 19, 2011

(65) Prior Publication Data
US 2012/0173860 A1    Jul. 5, 2012

(30) Foreign Application Priority Data

Dec. 29, 2010    (CN) .......................... 2010 1 0611346

(51) Int. Cl.
*G06F 9/00* (2006.01)
*G06F 9/24* (2006.01)
*G06F 15/177* (2006.01)
*G06F 13/00* (2006.01)
*H05K 7/10* (2006.01)
*G06F 13/20* (2006.01)

(52) U.S. Cl.
USPC ................... 713/1; 713/2; 713/100; 710/104; 710/301; 710/313

(58) Field of Classification Search
None
See application file for complete search history.

(56) References Cited

U.S. PATENT DOCUMENTS

| | | | |
|---|---|---|---|
| 6,314,525 B1* | 11/2001 | Mahalingham et al. | 714/4.12 |
| 6,425,079 B1* | 7/2002 | Mahmoud | 713/2 |
| 7,024,494 B1* | 4/2006 | Pathan et al. | 710/10 |
| 7,426,647 B2* | 9/2008 | Fleck et al. | 713/320 |
| 7,634,273 B2* | 12/2009 | Kim et al. | 455/445 |
| 2008/0276011 A1* | 11/2008 | Bircher et al. | 710/8 |
| 2009/0144533 A1* | 6/2009 | Mulcahy et al. | 713/2 |
| 2010/0050011 A1* | 2/2010 | Takamoto et al. | 714/4 |
| 2011/0016245 A1* | 1/2011 | Lindsay et al. | 710/113 |
| 2011/0087902 A1* | 4/2011 | Lu et al. | 713/300 |

OTHER PUBLICATIONS

Compaq Computer Corporation, "Compaq Integration Note: PCI Bus Numbering in a Microsoft Windows NT Environment", Dec. 2000.*

* cited by examiner

*Primary Examiner* — Ji H Bae
(74) *Attorney, Agent, or Firm* — Novak Druce Connolly Bove + Quigg LLP

(57) ABSTRACT

In a method for registering identification information of network interface cards (NICs) in an operating system of a computing device, each of the NICs is respectively and uniquely labeled with a number. A peripheral component interconnect (PCI) device identification (ID) of each of the NICs is allocated according to the labeled number of each NIC using a basic input output system (BIOS) of the computing device when the BIOS is booted up. Then identification information of each of the NICs is registered in the operating system according to the PCI device ID of each NIC using a NIC driver of the computing device, when the NIC driver is driven by the operating system during the booting up process of the operating system.

9 Claims, 4 Drawing Sheets

01:00.0  Ethernet controller:  Network Connection 01

02:00.0  Ethernet controller:  Network Connection 02

03:00.0  Ethernet controller:  Network Connection 03

04:00.0  Ethernet controller:  Network Connection 04

05:00.0  Ethernet controller:  Network Connection 05

06:00.0  Ethernet controller:  Network Connection 06

07:00.0  Ethernet controller:  Network Connection 07

08:00.0  Ethernet controller:  Network Connection 08

09:00.0  Ethernet controller:  Network Connection 09

0A:00.0  Ethernet controller:  Network Connection 0A

FIG. 3

COMPUTING DEVICE AND METHOD FOR REGISTERING IDENTIFICATION INFORMATION OF NETWORK INTERFACE CARD IN OPERATING SYSTEM

BACKGROUND

1. Technical Field

Embodiments of the present disclosure relate generally to network interface cards (NICs) of computing devices, and more particularly, to a computing device and method for registering identification information of NICs in an operating system of the computing device.

2. Description of Related Art

Many computing devices support a plurality of network interface cards (NIC), so that the computing devices can connect to different networks. When a user configures network parameters of the NICs, such as parameters of a transmission control protocol or an internet protocol (TCP/IP), it is difficult for the user to distinguish each of the NICs according to identification information of the NICs in an operating system of the computing devices. As an example, in a WINDOWS system, each of the NICs may be respectively allocated very simple and uninformative identifying names, such as, "Local Area Connection", "Local Area Connection 1" and "Local Area Connection 2", and so on. In addition, the identification information of the NICs may be changed when the NIC driver is reinstalled in the computing device, which makes it even harder for the user to distinguish each of the NICs.

BRIEF DESCRIPTION OF THE DRAWINGS

FIG. 3 is a schematic diagram illustrating one example of allocating identification information for each of the NICs in an operating system of the computing device.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
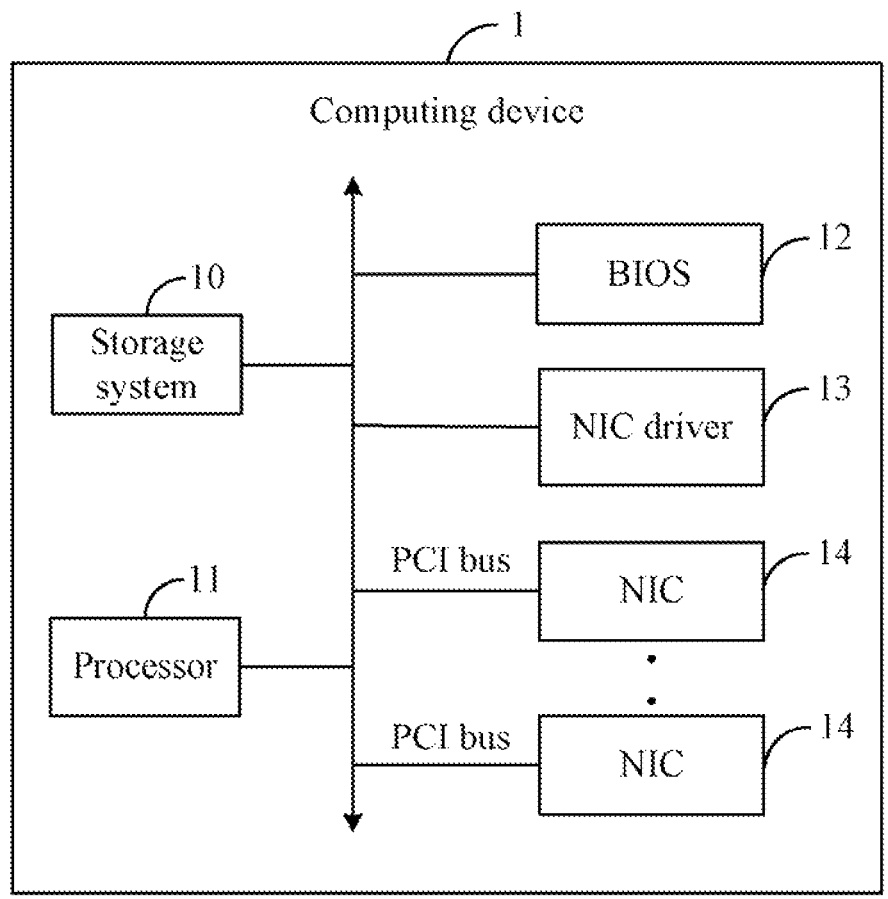
FIG. 1 is a block diagram of one embodiment of a computing device including a plurality of network interface cards (NICs).

FIG. 1 is a block diagram of one embodiment of a computing device 1 including a plurality of network interface cards (NICs) 14. In the embodiment, the computing device 1 further includes a storage system 10, a processor 11, a basic input output system (BIOS) 12, a network interface card (NIC) driver 13. The computing device 1 may be, a computer, or a server, for example. It should be apparent that FIG. 1 illustrates only one example of the computing device 1, and the computing device 1 can include more or fewer components in other embodiments, or have a different configuration of the various components.

The storage system 10 stores one or more programs, such as programs of an operating system, and other applications of the computing device 1. In one embodiment, the storage system 10 may be random access memory (RAM) for temporary storage of information, and/or a read only memory (ROM) for permanent storage of information. In other embodiments, the storage system 10 may also be an external storage device, such as a hard disk, a storage card, or a data storage medium. The processor 11 executes computerized operations of the computing device 1 and other applications, to provide functions of the computing device 1.

In one embodiment, each of the NICs 14 may be installed in the computing device 1 through a peripheral component interconnect (PCI) bus. Each of the NICs 14 is respectively and uniquely labeled with a number. As an example, referring to FIG. 2, the NICs 14 are labeled 1, 2, 3, and so on. The number of each NIC 14 may correspond to and be printed on a NIC port that is located on a motherboard of the computing device 1, and each NIC 14 can be plugged into the corresponding NIC port according to the labels.

The basic input output system (BIOS) 12 includes a plurality of programs that are stored in the storage system 10, such as a Flash ROM. The BIOS 12 provides a function library for controlling each of the NICs 14 and other peripherals of the computing device 1 to operate normally, such as the keyboard, video display card, hard disk, mouse, and other hardware. In the embodiment, one or more instruction codes are embedded in the BIOS 12, which is operable to allocate a peripheral component Interconnect (PCI) device identification (ID) for each of the NICs 14 according to the labeled number of each NIC 14. The PCI device ID of each NIC 14 includes a bus number, a device number of the NIC 14, and a function number of the NIC 14. The bus number represents a PCI bus to which each NIC 14 is connected.

Figure 2:
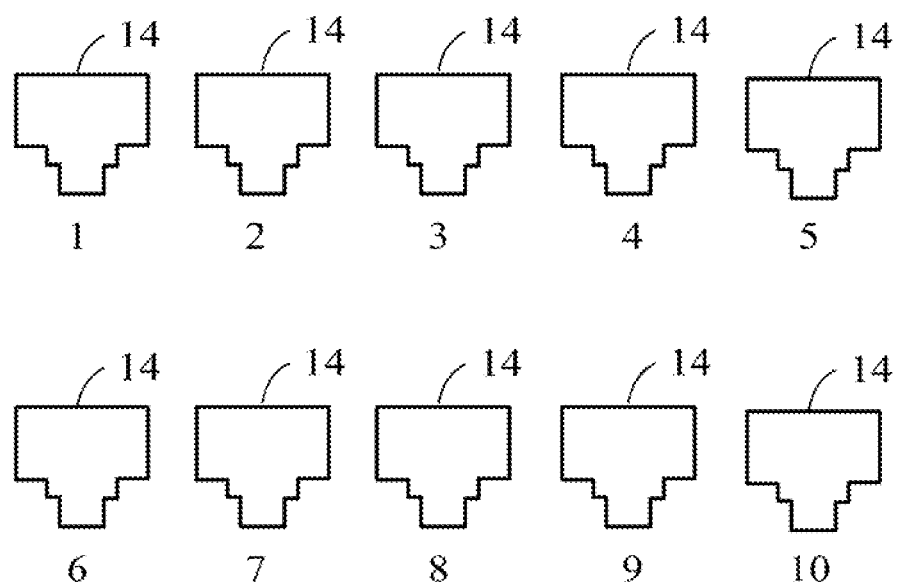
FIG. 2 is a schematic diagram illustrating one example of numbering the NICs of the computing device.

As an example, referring to FIG. 2, the BIOS 12 may allocate a PCI device ID of "01:00.0" for one of the NICs 14 labeled "1", where "01" represents the bus number, "00" represents the device number of the NIC 14, and "0" represents the function number of the NIC 14. In the embodiment, each of the NICs 14 has a unique bus number, but some or all of the NICs 14 may have the same device number and the same function number.

The NIC driver 13 includes a plurality of programs that are stored in the storage system 10 or embedded in the operating system of the computing device 1, and executed by the processor 11 to perform operations of the NICs 14. In one embodiment, the NIC driver 13 may be loaded by the operating system during the booting up process of the operating system. In the embodiment, the NIC driver 13 registers identification information for each of the NICs 14 in the operating system according to the PCI device ID of each NIC 14 when the NIC driver 13 is loaded by the operating system. The operating system may be, a WINDOWS system or a LINUX system, for example.

In one embodiment, the identification information of each NIC 14 in the operating system is registered according to the labeled number of each NIC 14. In one example with respect to FIG. 3, the NIC driver 13 may register identification information of "01:00.0 Ethernet controller: Network Connection 01" in the operating system for the NIC 14 that is labeled "1", and register identification information of "02:00.0 Ethernet controller: Network Connection 02" for the NIC 14 that is labeled "2".

Figure 4:
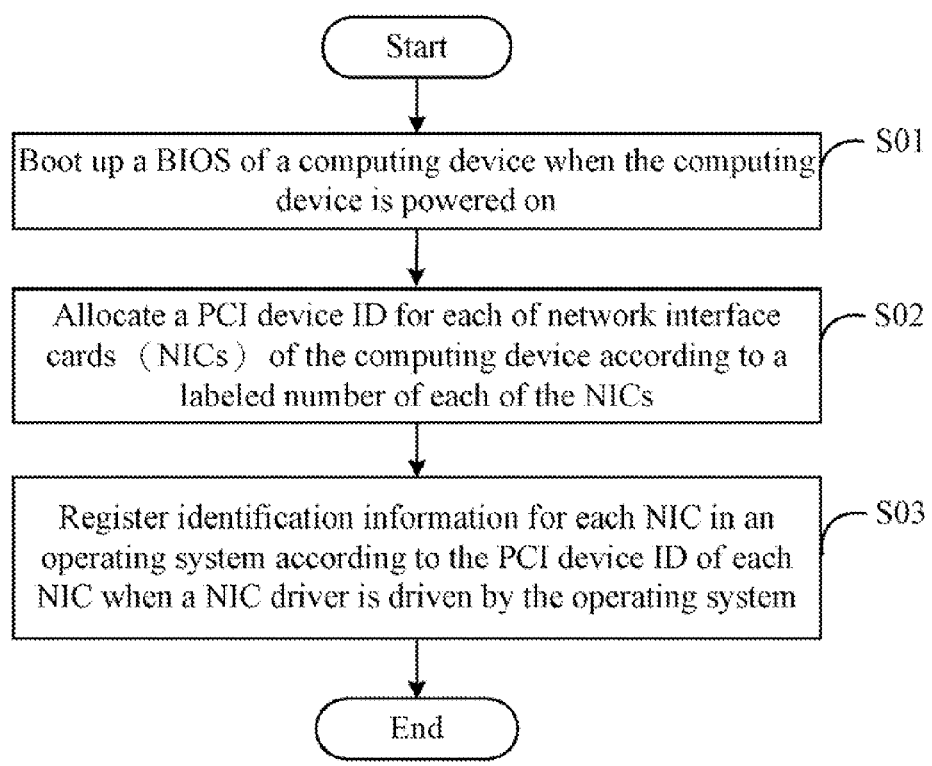
FIG. 4 is a flowchart of one embodiment of a method for registering identification information of the NICs in the operating system of the computing device of FIG. 1.

FIG. 4 is a flowchart of one embodiment of a method for registering identification information of NICs in an operating system of the computing device 1. Depending on the embodiment, additional blocks may be added, others removed, and the ordering of the blocks may be changed.

In block S01, the computing device 1 boots up the BIOS 12 when the computing device 1 is powered on. In the embodiment, one or more instruction codes are embedded in the BIOS 12 that may allocate different PCI device identifications (IDs) for the NICs 14.

In block S02, the BIOS 12 allocates a unique PCI device identification (ID) for each of the NICs 14 according to the labeled number of each NIC 14. Each of the NICs 14 is respectively and uniquely labeled with a number. In one example, with respect to FIG. 2, the NICs 14 are labeled 1, 2, 3, and so on. Details of allocating the PCI ID are illustrated in FIG. 2 and described above.

In block S03, the NIC driver 13 registers identification information for each of the NICs 14 in the operating system according to the PCI device ID of each NIC 14, when the NIC driver 13 is loaded by the operating system during the booting up process of the operating system. Thus, the identification information of each NIC 14 may be registered in the operating system according to the label of each NIC 14. Details of the identification information registering are illustrated in FIG. 3 and described above.

Using the method as described above, different network parameters of the NICs 14 may be easily configured because the NICs 14 can be easily distinguished from each other according to the identification information of each NIC 14 registered in the operating system.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for registering identification information of network interface cards (NICs) in an operating system of a computing device, each of the NICs being respectively and uniquely labeled with a number, the method comprising:

allocating a peripheral component interconnect (PCI) device identification (ID) for each of the NICs according to the labeled number of each of the NICs using a basic input output system (BIOS) of the computing device when the BIOS is booted up, wherein the PCI device ID of each of the NICs comprises a bus number corresponding to the labeled number, a device number, and a function number, and the bus number of each of the NICs is unique; and registering identification information for each of the NICs in the operating system according to the PCI device ID of each of the NICs using a NIC driver of the computing device, when the NIC driver is loaded by the operating system during the booting up process of the operating system.

2. The method according to claim 1, wherein the labeled number of each of the NICs corresponds to and is printed on a NIC port that is located on a motherboard of the computing device, and each of the NICs is plugged into the corresponding NIC port according to the labeled number.

3. The method according to claim 1, wherein the bus number of each of the NICs represents a PCI bus to which each of the NICs is connected.

4. A computing device, comprising:

a plurality of network interface cards (NICs) that are respectively and uniquely labeled with numbers;

at least one processor;

a storage system;

a basic input output system (BIOS) stored in the storage system and being executable by the at least one processor to allocate a peripheral component interconnect (PCI) device identification (ID) for each of the NICs according to a labeled number of each of the NICs when the BIOS is booted up, wherein the PCI device ID of each of the NICs comprises a bus number corresponding to the labeled number, a device number, and a function number, and the bus number of each of the NICs is unique; and a NIC driver stored in the storage system and being executable by the at least one processor to register identification information for each of the NICs in an operating system of the computing device according to the PCI device ID of each of the NICs, when the NIC driver is loaded by the operating system during the booting up process of the operating system.

5. The computing device according to claim 4, wherein the labeled number of each of the NICs corresponds to and is printed on a NIC port that is located on a motherboard of the computing device, and each of the NICs is plugged into the corresponding NIC port according to the labeled number.

6. The computing device according to claim 5, wherein the bus number of each of the NICs represents a PCI bus to which each of the NICs is connected.

7. A non-transitory storage medium storing a set of instructions, the set of instructions capable of being executed by a processor of a computing device, to perform a method for registering identification information of network interface cards (NICs) in an operating system of the computing device, each of the NICs being respectively and uniquely labeled with a number, the method comprising:

allocating a peripheral component interconnect (PCI) device identification (ID) for each of the NICs according to the labeled number of each of the NICs using a basic input output system (BIOS) of the computing device when the BIOS is booted up, wherein the PCI device ID of each of the NICs comprises a bus number corresponding to the labeled number, a device number and a function number, and the bus number of each of the NICs is unique; and registering identification information for each of the NICs in the operating system according to the PCI device ID of each of the NICs using a NIC driver of the computing device, when the NIC driver is loaded by the operating system during the booting up process of the operating system.

8. The storage medium as claimed in claim 7, wherein the labeled number of each of the NICs corresponds to and is printed on a NIC port that is located on a motherboard of the computing device, and each of the NICs is plugged into the corresponding NIC port according to the labeled number.

9. The storage medium as claimed in claim 8, wherein the bus number of each of the NICs represents a PCI bus to which each of the NICs is connected.

* * * * *